April 13, 1937.  A. G. MIREL  2,077,178
AUTOMATIC LANDING GEAR
Filed June 19, 1934
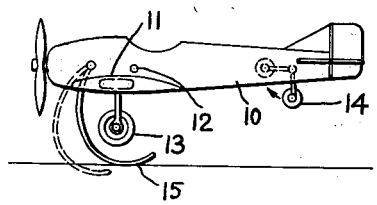
FIG.1.
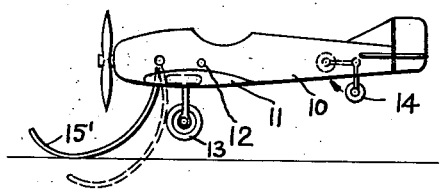
FIG.2.
FIG.3.
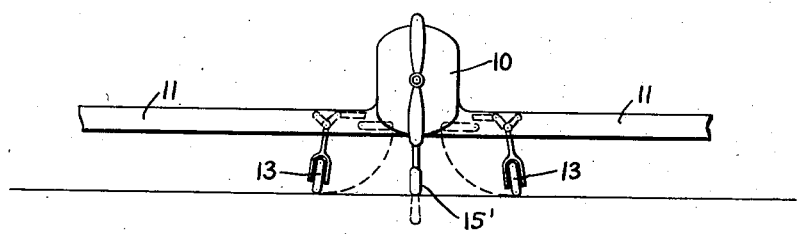
FIG.4.
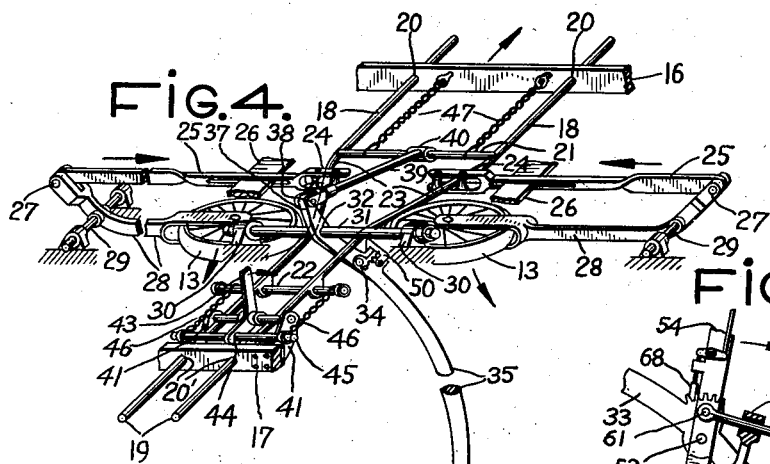
FIG.5.
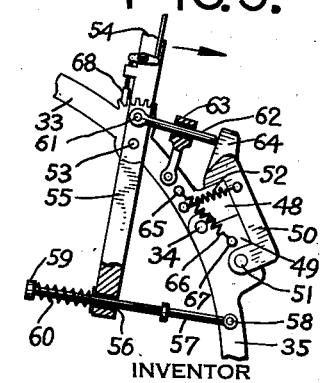
FIG.6.
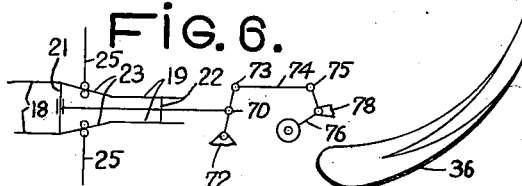
INVENTOR
Arthur George Mirel
BY
ATTORNEY Patented Apr. 13, 1937

2,077,178

UNITED STATES PATENT OFFICE 2,077,178

AUTOMATIC LANDING GEAR

Arthur George Mirel, New York, N. Y.

Application June 19, 1934, Serial No. 731,232

8 Claims. (Cl. 244—102)

This invention relates to aircraft in general, and particularly to an automatically operable landing gear.

The prime object of this invention is to provide an automatically retractable and automatically extendible landing gear for aircraft, controlled solely by contact with the ground, and capable of being rendered operative by the pilot in the event of emergencies.

Another object of this invention is to provide in such automatically operable landing gear, positive means whereby the gear is normally kept in its retracted position during flight, and means whereby the landing gear is placed into operative position prior to the alighting of the aircraft.

Another object of this invention is to provide in connection with an automatically operable landing gear, a positively actuated mechanism for operating the gear, which will commence its function considerably prior to the alighting of the aircraft, and which will continue to maintain the landing gear in its operative position as the aircraft descends, and rolls to its stop upon the ground.

Another object of this invention is to so construct the landing gear operating mechanism, as to serve not only as the actuating medium for the landing gear, but also to constitute a shock absorber and brake for the alighting aircraft.

Another object of this invention is to provide, as part of the operating mechanism of the device, a spur or skid, which while the aircraft is in flight, may serve as radio antenna.

Another object of this invention is to provide a landing skid adapted to fold up, when desired, especially when such skid is employed for amphibion aircraft so as to reduce or eliminate the drag while the aircraft is afloat.

Another object of this invention is to provide, in combination with the actuating mechanism of the device, hand operative means whereby the landing gear may be caused to assume its operative position in case of breakage of the operating spur or in any other emergency, necessitating the use of the landing gear, irrespective of the skid.

Another object of this invention is to provide, in combination with an aircraft, an automatically operable landing gear adapted to be normally retained in a retracted position, as for instance within the wings or the body of the aircraft, so as to offer none or the least resistance to the air, and means for automatically swinging it into operative or landing position the moment said means come in contact with the ground considerably prior to the gear's approximating the ground.

Another object of this invention is to so dispose the ground-contact controlled gear operating skid that the latter is connected with the aircraft at a point somewhat above and ahead of the tilting point of the aircraft, which latter point is usually located at the center of gravity thereof.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevation of an airplane equipped with my device in a position prior to alighting upon the ground;

Fig. 2 is a similar side elevation of an airplane provided with a somewhat modified form of my device;

Fig. 3 is a front elevation of an airplane with the landing gear in contact with the ground;

Fig. 4 is a perspective diagrammatical view of an arrangement of my device, illustrating the principal ideas of my invention, and serving for the purpose of enabling me to explain the basic principles thereof;

Fig. 5 is a detail view of an arrangement for collapsing the ground-contact control member; and Fig. 6 is a diagrammatical illustration of a possible movement transmission whereby the rear skid or rear wheel of an aircraft may be operated simultaneously with the front landing gear.

In the figures, numeral 10 denotes the body of an airplane provided with wings 11. The illustrations in Figs. 1, 2 and 3 merely indicate any kind of an aircraft, irrespective of its construction or intended use. In Figs. 1 and 2 the center of gravity of the aircraft is indicated at 12. Depending from the aircraft will be seen landing wheels 13, arranged in pairs, and a rear skid or rear wheel 14. All of the wheels are adapted to be normally swung upwards into the body or wings of the aircraft so as to offer the least or no air resistance during flight conditions. They are, however, intended to immediately assume an operative or landing position the moment the aircraft nears the ground. The automatic operation of the landing gears is accomplished by a skid or spur indicated in Fig. 1 at 15 and in Figs. 2 and 3 at 15'. Spur 15 is so arranged as to be curved backwards relative to the direction of flight of the aircraft, whereas 15' is curved forwards but in such a way that it will not dig into the ground during a normal landing, unless the aircraft approaches the ground at an extremely acute angle or practically perpendicularly. Skid 15' has the advantage of serving as guard for the propeller. From Figs 1 and 2 it will be observed that the point of attachment P of skids 15 and 15' is located above and ahead of the pivotal point 12 of the aircraft. This location of the attaching point is of importance for the reason that a skid may, when contacting with the ground, form a fulcrum for the plane and cause it, when too near the center of gravity, to tilt forwards, which would be undesirable. Also landing gears 13 are so mounted as to be ahead of the center of gravity 12 for the reason stated above.

In Figs. 1, 2 and 3 I have indicated landing gear 13 to be so mounted as to fold up or swing upwards in a direction transverse to the direction of flight, and I also have shown that they are nested within the wings of the plane. Obviously this arrangement may readily be changed so as to cause the landing gear to fold up into the body parallel to the direction flight, in the manner rear wheel 14 is mounted.

Referring now to Fig. 4, this figure is intended to serve no other purpose than that of enabling me to elucidate the working principle of my idea, for which reason dimensions and proportions are entirely disregarded, as well as structural details, which latter are merely indicated so that the drawing is rendered readable.

In this figure numeral 16 indicates a front portion of a stationary framework, whereas the rear portion thereof is marked at 17. In the framework is slidingly mounted and guided a carriage or movable member composed of front guides 18 and rear guides 19, sliding, respectively, through apertures 20 and 20' provided in their respective frame positions. Front members 18 are spread further apart than rear members 19 and are bridged and spaced by a connecting member 21. A similar connecting member 22 joins and spaces the rear guides 19.

The connection between front guides 18 and rear guides 19 is formed by divergent elements 23. These elements, and the narrower portions of the guides immediately adjacent to the elements, are intended to be engaged by the friction reducing ends 24 of connecting members 25, which latter extend sidewise relative to the slide arrangement, and are guided in a suitable manner as indicated at 26.

The outer ends of connecting members 25 are pivotally connected at 27 with wheel carriers 28, which latter are hinged at a fixed point 29 of the frame of the aircraft. These wheel carriers are adapted to normally retain their retracted position, as shown in Fig. 4, and they are further adapted to be brought into operative, downward or substantially vertical position, as will be hereinafter explained.

Mounted above the sliding carriage in fixed bearings 30 is shown a shaft 31 to which is keyed at 32 a spur or skid 33, preferably made of two parts hinged at 34, and extending downwardly into a brake member 35, preferably broadened out at 36.

The upper end of the skid terminates in a lever extension 37, to the end of which is hinged at 38 a connecting rod 39, operatively associated at 40 with spacer bar 21. Secured to the fixed frame portion 17 are bearing brackets 41, in which is operatively mounted shaft 42. Attached to the latter is a hand-operative lever 43, provided with a lever extension 44, normally located below the bearing points of shaft 42. Through this lever extension 44 passes a bar 45 to which are secured, with one of their ends, heavy springs or elastic shock cords 46, while their other ends of said cords 46 are attached to spacer bar 22, mounted in suitable lugs extending from the narrow sliding members 19.

Similar springs or shock cords 47 connect spacer bar 21 with fixed frame portion 16. Shock cords 46 are designed to overcome the tension of shock cords 47, but the latter are strong enough to pull the sliding frame towards fixed frame portion 16, in the event shock cords 46 are released at emergencies. Normally springs or shock cords 46 are intended to pull the sliding device towards fixed frame portion 17 into the position shown in Fig. 4. In so doing the diverging elements 23 cause connecting bars 25 to move outwards, whereby wheel carriages 28 are swung upwards. The moment skid 33 with its broadened lower portion 36 touches the ground, and thereby is swung in upward direction, its lever extension 37 is caused to swing forwards, thereby moving the slide, by means of connecting member 39 and spacer 21 towards frame portion 16. This forward movement overcomes the tension of springs or shock cords 46.

While elements 23 of the slide are moved forwards, connecting bars 25 are caused to gradually move inwards. Now, when the inner ends of the connecting bars are drawn together and finally engage the narrowly spaced slide members 19, the outer bar ends cause the wheel carriages 28 to assume their operative position, as shown in Fig. 3, in which position the carriages are maintained as long as skid 33 remains in contact with the ground.

Obviously, the closer the aircraft approaches the ground the more pressure will be exerted against the skid which will constantly change its position until its extreme compressed position is reached. During this movement of the skid its upper lever extension 37 follows the motion in opposite direction and pushes rod 39, and thereby spacer 21, forwards. Thus the entire slide is moved in the same direction for a considerable distance.

The movement of the slide causes, by way of converging elements 23, to draw connecting bars 25 towards one another, whereby wheel carriers 28 are gradually swung downwards and finally reach their operative position considerably prior to the aircraft's alighting. Between the time the wheels are completely swung out and the moment they touch the ground, the movement of the skid and that of the carriage or slide continues.

For this reason it is necessary that the narrowly spaced parallel bars 19 of the slide are of sufficient lengths so as to permit them to follow the movement of the skid, and at the same time to maintain connecting members 25 in their intended, adjacent position relative to one another, whereby the wheels are kept at their operative position.

The moment the aircraft lifts from the ground sufficiently so that the skid can gradually assume its normal, depending position, the slide is automatically propelled by springs or cords 46 to its normal state, shown in Fig. 4, at which the wheel carriers again assume their retracted position.

Under normal circumstances the operation of the skid and the landing gear is automatic. In the event of an emergency, or when the skid is incapacitated to perform its duty, and the landing gear is to be lowered, it becomes necessary to disengage springs or cords 46. This is accomplished by the operation of hand lever 43, which is swung downwards, as indicated by the arrow, thereby causing the extension 44 to swing upwards and to pass over bearings 41, thus rendering cords 46 inoperative. These cords, while in their normal position shown in the drawing, hold lever extension 44 in its downward position in the manner of a spring employed in toggle switch. As soon as cords 46 are rendered inoperative the weaker cords 47, mounted between members 18, pull the slide forwards and thereby cause wheel carriers 28 to assume their operative position.

In the event the automatic landing gear is employed in connection with an amphibion aircraft, the skid would, when the aircraft takes off from water, offer a resistance to the progress of the craft, for which reason I have provided means whereby the skid may be collapsed into a position at which it will render no obstacle to its movement in water.

A suggested construction of this kind is illustrated in Fig. 5 in which I assume that the spur 33 is hinged at 34 and that the hinged portions are provided with normally abutting lugs 48 and 49, which are held together by a pawl 50, hinged at 51 and kept under constant tension by springs or other means indicated at 52. Hingedly connected at 53 with spur 33 is a hand lever 54, which possesses a downward extension 55 provided with an aperture 56 in which is operatively mounted a rod 57, pivoted at 58 to spur portion 35, and provided with a head 59 against which bears an expansion spring 60.

Above pivotal point 53 there is hingedly attached to lever 54, at 61, a pawl releasing pin 62, guided in a swivel bearing 63, and adapted to contact with extension 64 of pawl 50. Secured at 65, above hinge 34, and connecting the respective skid portions, is a spring 66, the lower end of which is attached to a pin 67, located below and sidewise of pivotal point 34.

When it is desired to render the skid inoperative, by collapsing it, lever 54 is released from its fixed position, at which it is held by a pawl and tooth arrangement indicated at 68, and is swung in the direction of the arrow. Through this movement pin 62 will first unlatch pawl 50, and by a further movement in that direction of the lever rod 57 will cause to swing the lower portion of the skid upwards, being assisted by spring 66, which is intended to hold the lower skid member 35 in its collapsed position. Together with portion 35 swings also lever 54, which latter is retained in its new position by the pawl and tooth arrangement 68. When it is desired to again bring the skid to its normal state the movement of lever 54 is reversed. The above described construction of the collapsible skid is intended to merely indicate one of the many possible solutions, obviously capable of a good many improvements and modifications.

Referring now to Fig. 6, there is illustrated in a purely diagrammatical way the slide member, consisting of narrowly spaced bars 19 and wider spaced bars 18 with diverging elements 23, and also showing spacer bars 21 and 22. Secured to spacer bar 21 there is shown a connecting rod 69 which is pivotally associated at 70 with a lever 71, which latter is fulcrumed at a fixed point 72, and extends into a hinge connection 73 to which is attached one end of rod 74. The other end of the latter is hingedly connected at 75 to rear wheel carrier 76, which is hinged at a fixed point 78. This illustration is intended to show the connection between the slide, operating the landing gear, and the rear wheel, which latter is intended to be actuated at the same time with the landing gear.

The foregoing description of the drawing explains the principle of operation and the intent of my invention. No attention whatsoever was paid to any specific details or the mechanical perfection of the device, since such matter is rather obvious and may be executed in different ways by any one skilled in the art.

It is to be noted that in all illustrations, the spur or skid is intended to assume a depending position relative to the aircraft during flight conditions, as indicated in broken lines in Figs. 1 and 2, during which period the skid may readily serve as an antenna for radio communication between the aircraft and the outside.

It is also to be noted that the moment the skid touches the ground, and although being but slightly depressed, it immediately commences to operate the slide and induces the landing gear to assume its operative, downward position, considerably prior to the aircraft's alighting. By the same token, the moment the aircraft leaves the ground, the device is immediately so actuated as to retract the landing gear and cause the skid to depend in its normal, downward position.

The cooperation between the skid and the springs or shock cords, by means of which the movement of the slide is accomplished, is intended to serve as shock absorber for the aircraft when landing and when taking off, although the wheel carriers may be equipped in addition with individual shock-absorbing devices. In the construction shown in Fig. 2 the skid has the added advantage of forming a guard for the propeller during landing.

It will thus be seen that there is provided a device in which the several objects of this invention are achieved, and which is well adapted to meet the conditions of practical use.

As various possible embodiments might be made of the above invention, and as various changes might be made in the embodiments set forth, it is to be understood that all matter herein set forth or shown in the accompanying drawing, is to be interpreted as illustrative and not in a limiting sense.

Having thus described my invention, I claim as new and desire to secure by Letters Patent:—

1. The combination with an airplane, of an automatic landing gear, comprising a pair of pivotally mounted wheels, adapted to normally assume an inoperative position offering the least or no air resistance, a ground-contacting member, also pivotally mounted, and operatively connected with said wheels, said member adapted to normally assume a depending position, a spring-controlled mechanism forming the operative connection between said wheels and said member, and serving, together with the latter, as shock-absorber for the airplane during alighting, said member adapted, when brought in contact with the ground, to actuate said mechanism, which in turn translates the movement of said member to said wheels, thereby bringing them into swung-down, ground-engageable, operative position.

2. The combination with an airplane, of an automatic landing gear, comprising a pair of pivotally mounted wheels, adapted to normally assume an inoperative position offering the least or no air resistance, a ground-contacting member, also pivotally mounted, and operatively connected with said wheels, said member adapted to normally assume a depending position, a spring-controlled mechanism forming the operative connection between said wheels and said member, and serving, together with the latter, as shock-absorber for the airplane during alighting, said member adapted, when brought in contact with the ground, to actuate said mechanism, which in turn translates the movement of said member to said wheels, thereby bringing them into swung-down, ground-engageable, operative position, said ground-contacting member provided with means for bringing it to a swung-up position, when desired, and for restoring it to and for maintaining it at its normal, downward position.

3. The combination with an airplane, of an automatic landing gear, comprising a pair of pivotally mounted wheels, adapted to normally assume an inoperative position offering the least or no air resistance, a ground-contacting member, also pivotally mounted, and operatively connected with said wheels, said member adapted to normally assume a depending position, a spring-controlled mechanism forming the operative connection between said wheels and said member, and serving, together with the latter, as shock-absorber for the airplane during alighting, said member adapted, when brought in contact with the ground, to actuate said mechanism, which in turn translates the movement of said member to said wheels, thereby bringing them into swung-down, ground-engageable, operative position, said mechanism comprising movable elements, in coaction with said wheels, being so constructed as to maintain the latter at their inoperative position when said elements are at their normal, spring-induced position, and to cause the wheels to swing downwards when the position of the elements is changed by the operation of said ground-contacting member.

4. In an automatic landing gear device, a pair of hingedly attached wheel carriers, connecting means extending from the carriers towards one another, an actuating mechanism operatively associated with said connecting means and located substantially midway between said carriers, said mechanism provided with movable elements intended, when in their normal position, to cause said connecting means to elevate said carriers, and, when actuated, to so move said connecting means as to cause said carriers to swing into operative, downward position, and ground-contact controlled means in cooperation and connected with said mechanism and adapted to actuate the latter when coming in touch with the ground, and to release it to assume its normal position, when freed from the ground.

5. In an automatic landing gear for aircraft, a ground-contact controlled member, landing gear devices operatively associated therewith, motion translating means connecting said member with said landing gear devices, said member adapted to normally depend from the aircraft during flight and to serve then as radio antenna, and further adapted to bring said landing devices into operative position prior to the aircraft alighting, and to serve as skid or brake, and as guard for the propeller of the aircraft, the point of attachment of said member being located ahead of the center of gravity of the aircraft.

6. An automatic landing gear for aircraft, comprising in combination, retractable landing wheels, adapted to repose during flight at a position relative to the aircraft at which they will offer the least or no air resistance, a ground-contact controlled member, motion translating means operatively connecting the latter with said landing wheels and adapted to maintain said wheels at their normal, retracted position during flight, and further adapted to be actuated by the movement of said member and to cause when actuated, to swing said landing wheels to a ground-contacting position, prior to the aircraft's alighting, said member provided with means for collapsing it and for bringing it into operative position, at will.

7. In an airplane having landing gear and a ground contact controlled member, means for converting the swinging motion of the ground contact controlled member about one axis into a swinging motion of the landing gear about an axis perpendicular to the first axis.

8. In an airplane having landing gear and a ground contact controlled member, means for converting the swinging motion of the ground contact controlled member about one axis into a swinging motion of the landing gear about an axis perpendicular to the first axis, said means including a shock absorber for the air craft during alighting and take-off.

ARTHUR GEORGE MIREL.